United States Patent [19]
Williams et al.

[11] Patent Number: 5,537,234
[45] Date of Patent: Jul. 16, 1996

[54] RELECTIVE LIQUID CRYSTAL DISPLAY INCLUDING DRIVER DEVICES INTEGRALLY FORMED IN MONOCRYSTALLINE SEMICONDUCTOR LAYER AND METHOD OF FABRICATING THE DISPLAY

[75] Inventors: Ronald L. Williams, San Marcos; Steven E. Shields, San Diego; Ogden J. Marsh, Carlsbad, all of Calif.

[73] Assignee: Hughes Aircraft Company, Los Angeles, Calif.

[21] Appl. No.: 6,118

[22] Filed: Jan. 19, 1993

[51] Int. Cl.⁶ .......................... G02F 1/136; H01L 27/04; H01L 29/78
[52] U.S. Cl. .................. 359/59; 359/88; 257/301; 257/350
[58] Field of Search ................... 359/58, 59, 82, 359/87, 88, 54; 257/301–303, 347, 350; 345/92

[56] References Cited

U.S. PATENT DOCUMENTS

| | | | |
|---|---|---|---|
| 3,862,360 | 12/1975 | Dill et al. | 178/7.3 D |
| 4,239,346 | 12/1980 | Lloyd | 350/334 |
| 4,432,610 | 2/1984 | Kobayashi et al. | 359/59 |
| 4,668,366 | 5/1987 | Zarowin | 204/192.1 |
| 5,056,895 | 10/1991 | Kahn | 359/71 |
| 5,189,500 | 2/1993 | Kusunoki | 359/48 |
| 5,206,749 | 4/1993 | Zavracky et al. | 359/59 |
| 5,251,049 | 10/1993 | Sato et al. | 359/59 |
| 5,317,432 | 5/1994 | Ino | 359/59 |
| 5,317,433 | 5/1994 | Miyawaki et al. | 359/74 |
| 5,377,031 | 12/1994 | Vu et al. | 359/59 |
| 5,434,433 | 6/1995 | Takasu et al. | 359/59 |
| 5,444,557 | 8/1995 | Spitzer et al. | 359/68 |

FOREIGN PATENT DOCUMENTS

| | | |
|---|---|---|
| 0486318 | 5/1992 | European Pat. Off. . |
| 63-055529 | 7/1988 | Japan . |
| 3100516A | 4/1991 | Japan . |
| 4128717A | 4/1992 | Japan . |
| 4115232A | 4/1992 | Japan . |

Primary Examiner—William L. Sikes
Assistant Examiner—Tai V. Duong
Attorney, Agent, or Firm—M. E. Lachman; M. W. Sales; W. K. Denson-Low

[57] ABSTRACT

A silicon dioxide etch stop layer (30) is formed on an inner surface (28b) of a monocrystalline silicon semiconductor layer (28), and a silicon carrier wafer (52) is bonded to the etch stop layer (30). The exposed outer surface (28a) of the layer (28) is uniformly thinned to approximately 4 micrometers. Vertical interconnects or vias (49) are formed through the layer (28), and microelectronic transistor driver devices (42) and storage capacitors (47) are formed on the outer surface (28a) of the layer (28) in connection with the respective vias (49). A substrate (12) is adhered to the outer surface (28a) of the layer (28), and the carrier (52) is removed. Reflective metal back electrodes (20) are formed on the insulating layer (30) in connection with the respective vias (49). A transparent front plate (14) having a transparent front electrode (16) formed thereon is adhered to the insulating layer (30) such that a sealed space (24) is defined between the electrodes (16,20) which is filled with liquid crystal material (26). Large scale integrated driver circuitry (38,40) is fabricated in the peripheral portion (28c) of the layer (28) laterally external of the plate (14) and is externally interconnected by via holes (28d,28e) and wirebonds (44, 45).

12 Claims, 6 Drawing Sheets

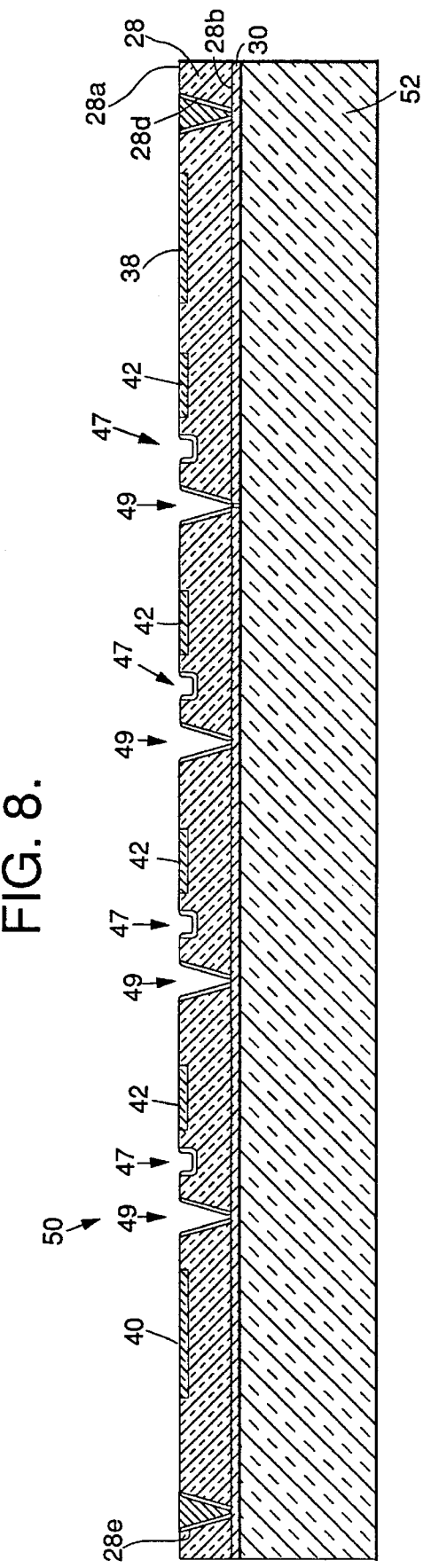
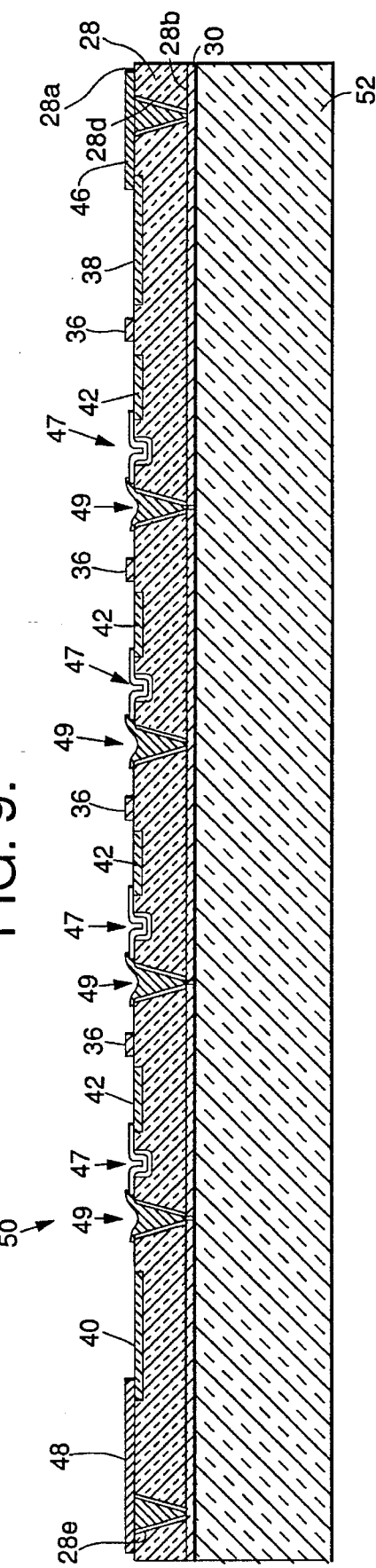

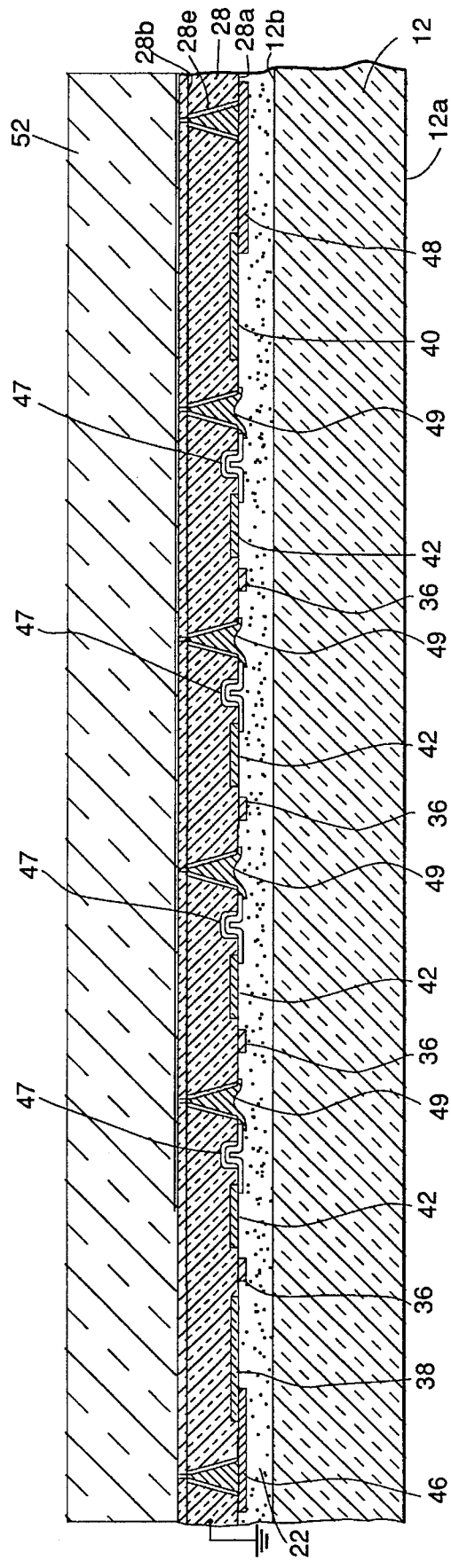
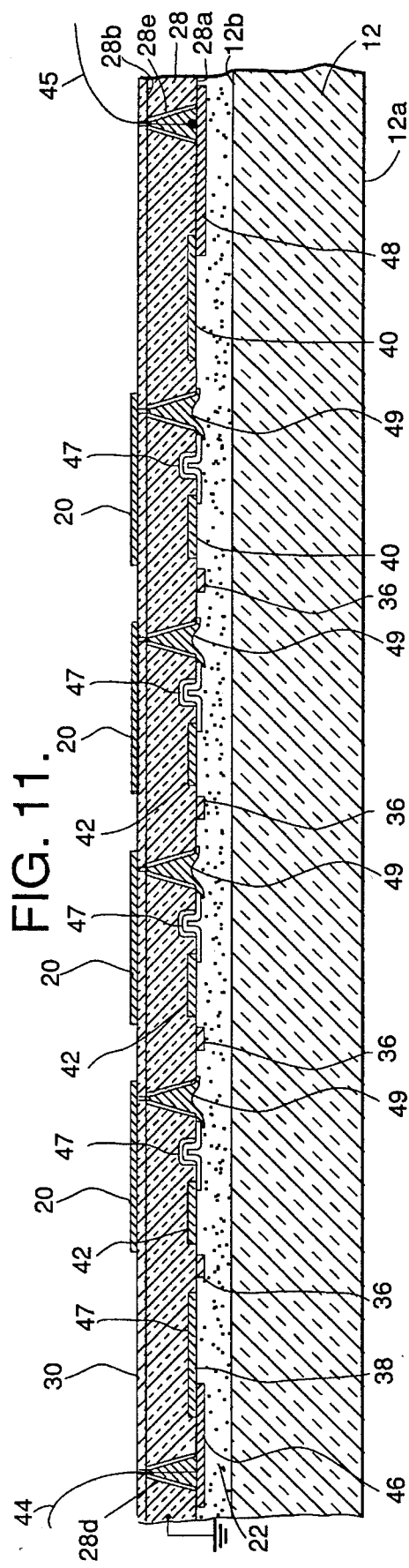

RELECTIVE LIQUID CRYSTAL DISPLAY INCLUDING DRIVER DEVICES INTEGRALLY FORMED IN MONOCRYSTALLINE SEMICONDUCTOR LAYER AND METHOD OF FABRICATING THE DISPLAY

BACKGROUND OF THE INVENTION

1. Field of the Invention

The present invention generally relates to the field of liquid crystal devices, and more specifically to a high speed reflective liquid crystal display and fabrication method in which electrode driver devices are integrally formed in a transparent monocrystalline silicon semiconductor layer.

2. Description of the Related Art

A typical reflective liquid crystal display includes a sealed space which is filled with a liquid crystal material. A transparent front electrode and an array of back electrodes are disposed on opposite sides of the space and are selectively energized to apply electric fields to the liquid crystal material to cause it to locally change its orientation resulting in a spatially variant perturbation of the light passing through. A capacitor is connected in parallel with each back electrode for charge storage.

Different liquid crystal materials affect light passing therethrough by different mechanisms, such as variable birefringence, scattering, etc. The display may provide only discrete black and white levels, or a continuous gray scale. In either case, the liquid crystal material will appear dark when polarized such that it is clear and incident light is reflected away from the viewer by the back electrodes, and will appear light when polarized such that it is opaque and scatters the incident light.

The back electrodes can be arranged in segments to provide an alphanumeric display for a calculator or clock, or in a rectangular matrix to provide a continuous graphic image for television, computer and other applications.

U.S. Pat. No. 4,239,346, entitled "COMPACT LIQUID CRYSTAL DISPLAY SYSTEM", issued Dec. 16, 1980 to R. Lloyd discloses a reflective Active-Matrix Liquid-Crystal Display (AMLCD) including a transparent front electrode and back electrodes which define a sealed space therebetween which is filled with liquid crystal material. The front electrode is formed on the inner surface of a front plate, whereas a semiconductor layer and back electrodes are formed on the inner surface of a back plate.

The back electrodes are formed of a reflective metal in a rectangular matrix pattern on the inner surface of the semiconductor layer in contact with the liquid crystal. MOSFET electrode driver transistors, interconnected by polycrystalline silicon bus lines, are also formed in the semiconductor layer, and are operatively connected to the electrodes. Electrical potentials are selectively applied between the individual back electrodes and the front electrode via the bus lines and driver transistors to locally polarize the liquid crystal material and form an image complete with gray scale.

The preferred material for the front and back plates is glass, due to its negligible reactivity with liquid crystal materials, low cost and transparency. Although epitaxial deposition of monocrystalline (single crystalline or bulk) silicon is possible on various materials such as sapphire, the temperature required for deposition is on the order of 1,000° C., which is far in excess of the melting point of glass. In addition, the atomic structure of glass is highly irregular, and non-conducive to the growth of an epitaxial silicon layer.

For these reasons, the silicon layer on the back plate of Lloyd's display is formed by a standard silicon wafer. Alternative displays have used silicon layers formed by chemical vapor deposition (CVD) of amorphous or polycrystalline silicon. CVD of these materials can be performed at low temperatures and is not adversely affected by the irregular crystalline structure of the glass material of the plate.

However, the carrier mobility of polycrystalline silicon is one-eighth that of monocrystalline silicon, and the mobility of amorphous silicon is one-hundredth that of monocrystalline silicon. The operating speed of a microelectronic device is linearly proportional to the mobility. The low mobility of polycrystalline and amorphous silicon limits the operating speed of the electrode driver transistors and thereby the displays in which they are incorporated. These devices generally operate at less than 60 Hz, which is a common video display speed. In order to accommodate the leakage current and refresh time of transistors fabricated in polysilicon for 60 Hz operation, two transistors are connected in series to obtain sufficiently high impedance and low current.

SUMMARY OF THE INVENTION

In accordance with the present invention, a silicon dioxide etch stop layer is formed on an inner surface of a monocrystalline silicon semiconductor layer, and a silicon carrier wafer is bonded to the etch stop layer.

The exposed outer surface of the semiconductor layer is uniformly thinned to approximately 4 micrometers. Vertical interconnects or vias are formed through the semiconductor layer, and microelectronic transistor driver devices and storage capacitors are formed on the outer surface of the semiconductor layer in connection with the respective vias.

A substrate is bonded to the outer surface of the semiconductor layer, and the carrier is removed. Metal back electrodes are formed on the insulating layer in connection with the respective vias. A transparent plate having a front electrode formed thereon is adhered to the insulating layer such that a sealed space is defined between the front and back electrodes which is filled with liquid crystal material.

Large scale integrated driver circuitry is fabricated in the peripheral portion of the layer laterally external of the plate and externally interconnected by via holes and wirebonds.

The electrode driver transistors which are formed in the present monocrystalline silicon layer have much higher carrier mobility than comparable transistors formed in polycrystalline and amorphous silicon as described above. The higher mobility enables higher current per junction area, allowing the size of the transistors to be reduced and provide an increase in resolution and fill factor (ratio of active area to total area of display).

These and other features and advantages of the present invention will be apparent to those skilled in the art from the following detailed description, taken together with the accompanying drawings, in which like reference numerals refer to like parts.

DESCRIPTION OF THE DRAWINGS

FIGS. 6 to 11 are simplified sectional views illustrating a method of fabricating the present display according to the present invention.

DETAILED DESCRIPTION OF THE INVENTION

Figure 1:
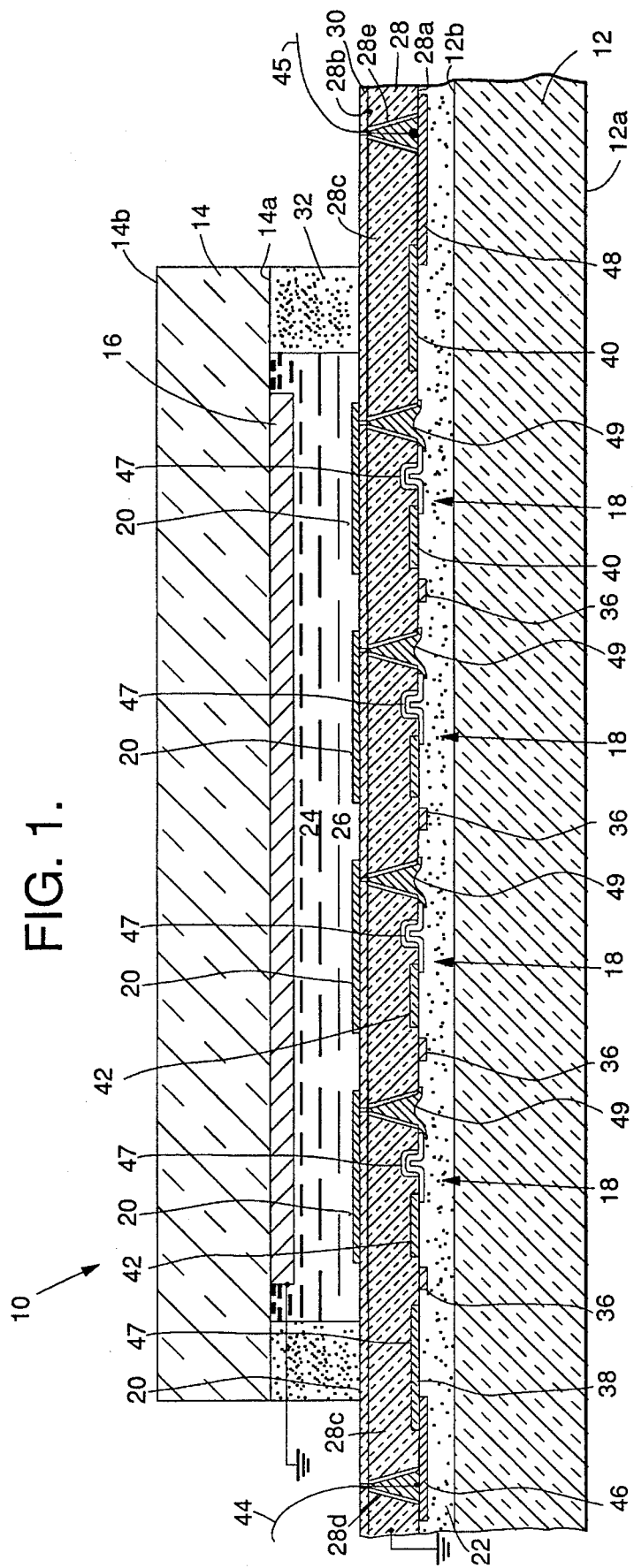
FIG. 1 is a simplified sectional view illustrating a liquid crystal display embodying the present invention.

As illustrated in FIGS. 1 to 5, a liquid crystal display 10 embodying the present invention includes a substrate 12 having a back or outer surface 12a and front or inner surface 12b, and a transparent glass front plate 14 having a back or inner surface 14a and a front or outer surface 14b. The display 10 is viewed through the front plate 14.

A transparent front electrode 16 is formed on the inner surface 14a of the front plate 14, whereas a plurality of unit cells 18 including reflective metal back electrodes 20 are disposed adjacent to the inner surface 12b of the substrate 12. The substrate 12 and plate 14 are sandwiched together with a predetermined spacing therebetween, and sealed at the peripheral edge of the plate 14 to define a sealed space 24 which is filled with a liquid crystal material 26.

Figure 2:
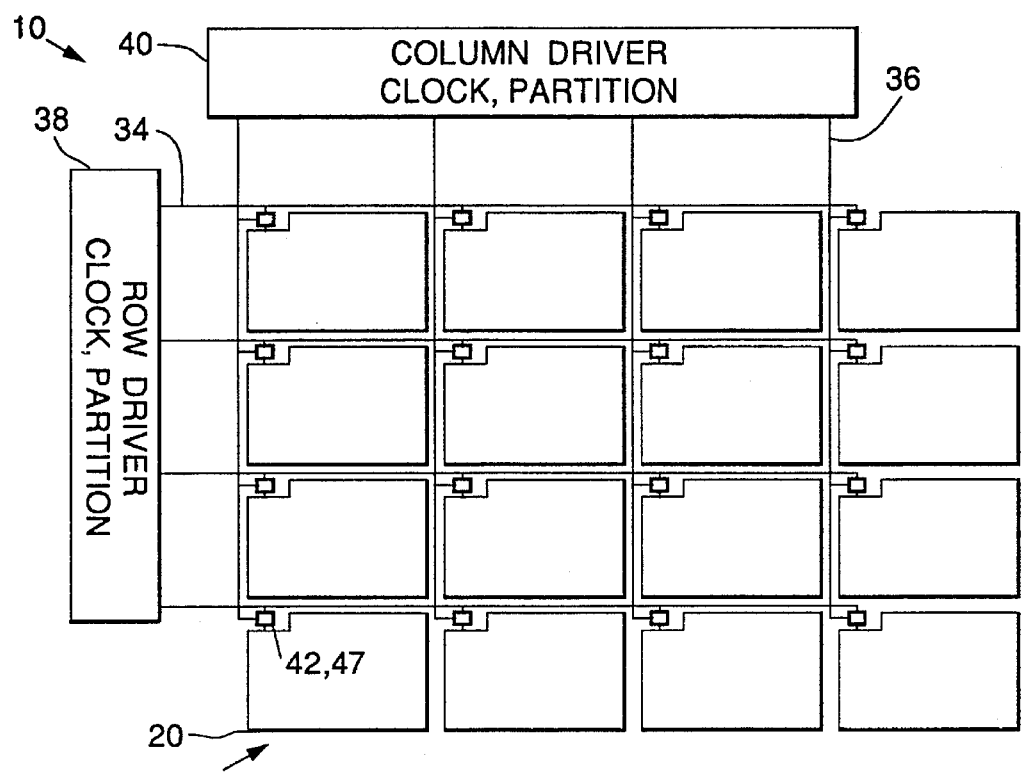
FIG. 2 is a diagram illustrating the arrangement of back electrodes, electrode driver transistors and bus lines of the display.

The front electrode 16 and cells 18 can be arranged in any desired configuration within the scope of the invention. In the preferred configuration as illustrated in FIG. 2, the cells 18 are arranged in a rectangular grid array to form an Active-Matrix Liquid-Crystal Display (AMLCD). Alternatively, although not illustrated, the electrodes can be arranged as segments which are selectively switched to form numerals or alphanumeric characters, or as an array of rectangular plates not ordered in rows and columns, but in other patterns, such as the bricks in a brick wall might be ordered.

The electrodes 20 are individually and selectively switched to a range of voltages such that the electric field between the electrodes 20 and the electrode 16 causes the local orientation of the liquid crystal material 26 to switch continuously between two discrete states. In the case of birefringent liquid crystal materials, one or more polarizer plates (not shown) are provided for polarizing light passing through the material 26 such that the material 26 appears light or dark in response to the applied field.

In accordance with the invention, a monocrystalline (single crystalline or bulk) semiconductor layer 28 has an outer surface 28a which is adhered to the inner surface 12b of the substrate 12 by an adhesive 22, and a front or inner surface 28b. The preferred material for the semiconductor layer 28 is silicon, although other semiconductor materials such as gallium arsenide, cadmium selenide or cadmium telluride can be used within the scope of the invention.

The semiconductor layer 28 has a peripheral portion 28c which extends laterally external of the front plate 14. An insulating layer 30, such as silicon dioxide or silicon nitride, is formed on the inner surface 28b of the semiconductor layer 28. The semiconductor layer 28 and insulating layer 30 are initially part of a bonded silicon wafer structure as will be described in detail below with reference to FIG. 6. The back electrodes 20 are formed on the insulating layer 30. The front plate 14 is adhered to and spaced from the semiconductor layer 28 by a peripheral seal 32 which is made of epoxy resin or the like. If desired, additional spacers such as transparent microballs (not shown) which have a diameter equal to the desired spacing between the semiconductor layer 28 and plate 14 can be dispersed in the liquid crystal material 26.

The space 24 is defined between the inner surface 28b of the semiconductor layer 28 (with the insulating layer 30 and electrodes 20 formed thereon) and the inner surface 14a of the front plate 14 (with the front electrode 16 formed thereon), with the liquid crystal material 24 being disposed between the electrodes 16 and 20.

Figure 3:
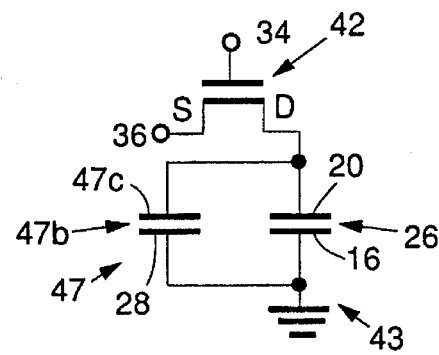
FIG. 3 is an electrical schematic diagram illustrating the equivalent circuit of a unit cell of the display.
Figure 4:
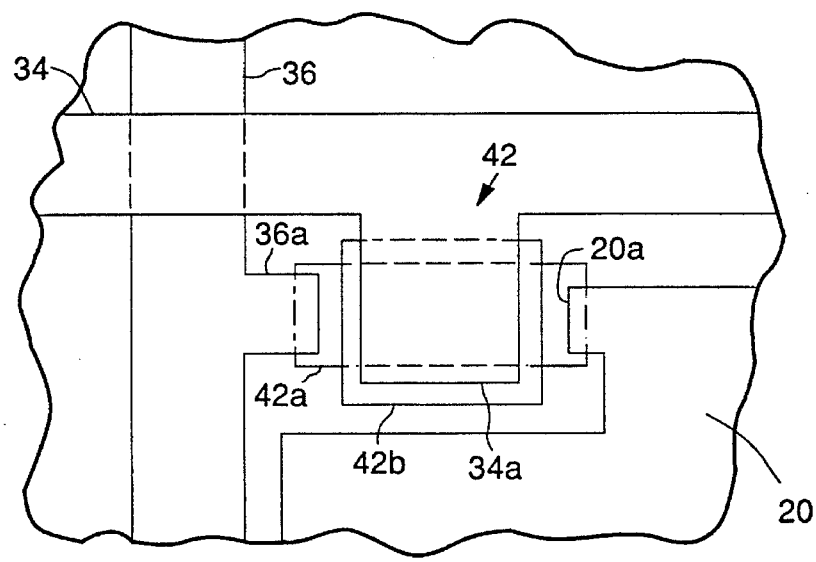
FIG. 4 is a diagram illustrating the arrangement of a single electrode driver transistor device of the unit cell of FIG. 3.
Figure 5:
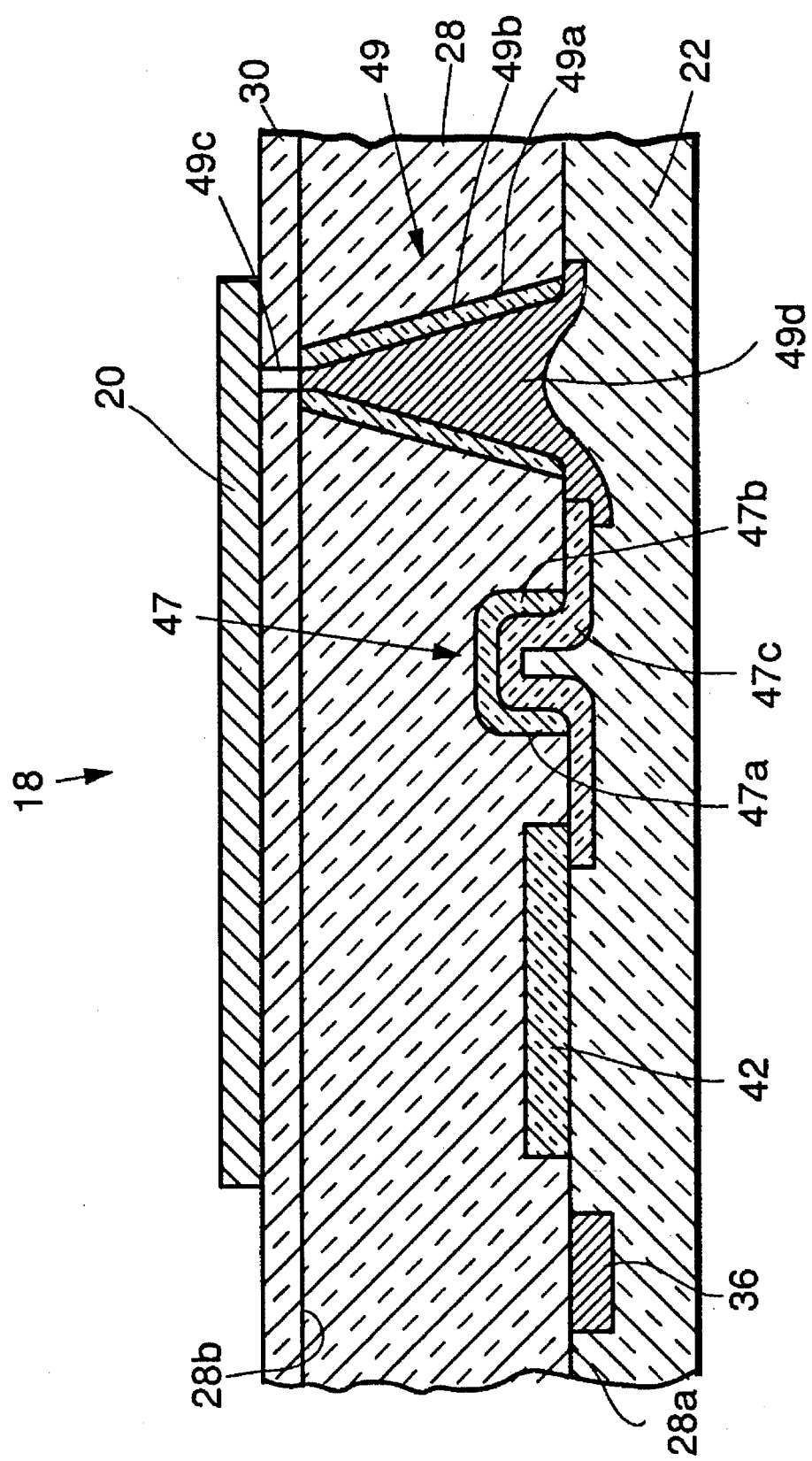
FIG. 5 is a simplified sectional view illustrating the unit cell of FIG. 3 to enlarged scale.

As illustrated in FIG. 2, the unit cells 18 are arranged in a rectangular matrix configuration. Sixteen cells 18 (one cell 18 is illustrated in FIGS. 3 to 5) are arranged in a 4×4 matrix. The number of cells 18 is not limited within the scope of the invention. A practical display might include, for example, 262,144 unit cells arranged in a 512×512 matrix.

The display 10 as viewed in FIG. 2 includes four row select bus lines 34 and four column select bus lines 36 which are formed on the outer surface 28a of the semiconductor layer 28. The lines 34 and 36 may be aluminum or other suitable metallizations as illustrated, or alternatively may be formed as heavily doped, electrically conductive lines in the material of the semiconductor layer 28.

An external row driver circuit 38 sequentially applies a select signal to the row select lines 34. A column driver circuit 40 applies signals to the column select lines 36 which designate the polarization states and the corresponding light transmission characteristics for the individual cells 18 in the selected row. In this manner, the rows are sequentially scanned to generate a pixelized graphic image.

An equivalent circuit diagram of a unit cell 18 is illustrated in FIG. 3. The respective row select line 34 is connected to the gate of a microelectronic thin film MOSFET electrode driver device transistor 42, whereas the respective column select line 36 is connected to the source of the transistor 42. The drain of the transistor 42 is connected to the respective electrode 20.

The semiconductor layer 28 and the front electrode 16 are connected to ground or other signal reference point. The drain of the transistor 42 is connected to ground through a capacitor 43 including the electrodes 16 and 20 which constitute the plates, and the liquid crystal material 26 which constitutes the dielectric. Additional charge storage which enables the present display 10 to operate with gray scale at video display speeds of at least 60 Hz is provided by a trench capacitor 47 which is connected in parallel with the capacitor 43.

This electrical layout is well known per se, having being described in an article entitled "LIQUID CRYSTAL MATRIX DISPLAYS", by Lechner et al, in Proceedings of the IEEE, Vol. 59, No. 11, November 1971, pp. 1566–1579, as well as in U.S. Pat. No. 3,862,360, entitled "LIQUID CRYSTAL DISPLAY SYSTEM WITH INTEGRATED SIGNAL STORAGE CIRCUITRY", issued Jan. 21, 1975 to H. Dill et al.

The row select signal turns on the transistor 42, which gates the column select signal from the source to the drain and thereby to the electrode 20. The column select signal assumes a variable value in proportion to the gray level to be displayed which causes the electrodes 16 and 20 to create a local electric field therebetween. This field polarizes the liquid crystal material 26 to a corresponding state in which it affects the transmitted light in accordance with the value of the column select signal.

The electrode driver transistors 42 are formed on the outer surface 28a of the semiconductor layer 28 as thin film enhancement MOSFETs or other types of transistor devices to constitute an integral microelectronic structure with the trench capacitors 47 and select lines 34 and 36. An exemplary configuration of the transistor 42 is illustrated in FIG. 4, and includes a channel 42a which is doped to N or P conductivity type by a suitable process such as ion implantation.

An insulative gate oxide layer 42b is deposited over the channel 42a. A tab 34a extends from the row select line 34 over the oxide layer 42b to constitute the gate of the transistor 42. A tab 36a extends from the column select line 36 over the left end (as viewed in FIG. 4) of the channel 42a and is electronically interconnected with it to constitute the source. A tab 20a extends from the electrode 20 over the right end of the channel 42a and is similarly electrically interconnected to constitute the drain.

As best viewed in FIG. 5, each trench capacitor 47 includes a trench 47a formed in the outer surface 28a of the semiconductor layer 28, and an insulating layer 47b of, for example, silicon dioxide which coats the walls of the trench 47a. A polysilicon conductive layer 47c is formed over the insulating layer 47b and extends laterally into ohmic contact with the drain of the transistor 42. As viewed in FIG. 3, the conductive layer 47c and the semiconductor layer 28 constitute the plates of the trench capacitor 47, whereas the insulating layer 47b constitutes the dielectric.

A vertical interconnect or via 49 extends through the semiconductor layer 28 for connecting the transistor 42 and capacitor 47 to the electrode 20. The via 49 includes an opening 49a which is formed through the semiconductor layer 28. An insulating layer 49b of silicon dioxide or the like is coated on the walls of the opening 49a. Another opening 49c is formed through the insulating layer 30 which interconnects with the opening 49a inside the layer 49b.

A metallization 49d of aluminum or the like is formed over the insulating layer 49b, fills the opening 49b and makes ohmic contact with the electrode 20. The metallization 49d also extends laterally into ohmic contact with the polysilicon conductive layer 47c. In this manner, the drain of the transistor 42 is connected to the electrode 20 through the conductive layer 47c of the trench capacitor 47 and the metallization 49d of the via 49, and the trench capacitor 47 is connected in parallel with the electrode 20.

In accordance with the invention, the row driver circuit 38 and the column driver circuit 40 are fabricated as microelectronic circuits of the outer surface 28a in the peripheral portion 28c of the semiconductor layer 28. The circuits 38 and 40 are fabricated at the same time as and using the same silicon processing technology as the transistors 42, trench capacitors 47 and vias 49.

Referring again to FIG. 1, insulated via openings 28d and 28e are formed through the insulating layer 30 and the peripheral portion 28c of the semiconductor layer 28 and open onto bonding pads 46 and 48 which are formed on the outer surface 28a of the semiconductor layer 28. The bonding pads 46 and 48, although not explicitly illustrated, are interconnected to the circuits 38 and 40 respectively.

Although only two via openings 28d and 28e and bonding pads 46 and 48 are shown for simplicity of illustration, in practical application a large number of via openings and bonding pads will be provided. External connection to the bonding pads 46 and 48 is made by wirebonds 44 and 45 respectively or other suitable conductors which extend into ohmic connection with the pads 46 and 48.

In addition to including row and column drivers per se, the driver circuits 38 and 40 preferably large scale integrated microcircuits which provide clock, partitioning, housekeeping and other functions. This enables substantially all of the microelectronic circuitry for the display 10 including the driver transistors 42 and trench capacitors 47 to be integrally fabricated in the outer surface 28a of the semiconductor layer 28.

The electrode driver transistors 42 which are formed in the present monocrystalline silicon semiconductor layer 28 have much higher carrier mobility than comparable transistors formed in polycrystalline and amorphous silicon or glass as in the prior art. The higher mobility enables higher current per junction area, allowing the size of the transistors to be reduced and provide an increase in resolution and fill factor (ratio of active area to total area of display).

Figure 6:
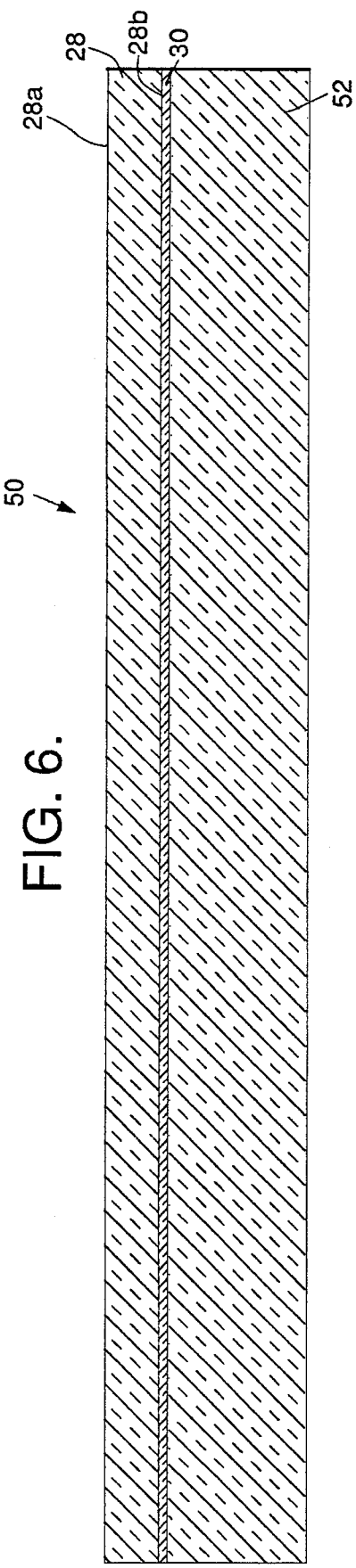

A method of fabricating the display 10 is illustrated in FIGS. 6 to 11. In FIG. 6, a bonded structure 50 is provided as including the monocrystalline silicon semiconductor layer 28, with the silicon dioxide layer 30 formed on the inner surface 28b thereof. A sacrificial carrier wafer 52 is bonded to the oxide layer 30.

The semiconductor layer 28 has a thickness of 2-8 micrometers, chosen to optimize the electro-optical performance of the liquid crystal as is well known in the art. The carrier wafer 52 is preferably formed of silicon and has a thickness of 525 micrometers, making it sufficiently durable to support the semiconductor layer 28 through standard silicon processing steps. The silicon dioxide layer 30 is typically one micrometer thick.

The structure 50 is fabricated by initially providing the semiconductor layer 28 in the form of a wafer having a thickness on the order of that of the carrier wafer 52. The semiconductor layer 28 is oxidized to form the silicon dioxide layer 30. The wafers are then pressed together with or without the intermediary of an adhesive, and the outer surface 28a is etched or otherwise processed to thin the semiconductor layer 28 to the desired thickness.

The preferred method of thinning the monocrystalline silicon semiconductor layer 28 is Plasma Assisted Chemical Etching (PACE) as disclosed in U.S. Pat. No. 4,668,366, entitled "OPTICAL FIGURING BY PLASMA ASSISTED CHEMICAL TRANSPORT AND ETCHING APPARATUS THEREFOR", issued May 26, 1987 to C. Zarowin, which enables the outer surface 28a to be planarized and the thickness of the semiconductor layer 28 to be made highly uniform. Structures 50 which are suitable for practicing the present invention are commercially available from, for example, Shin-Etsu Handotai (SEH) of Tokyo, Japan. The semiconductor layer 28 is planarized to 3.0–6.0, preferably 4.0 micrometers using the PACE process.

Figure 7:
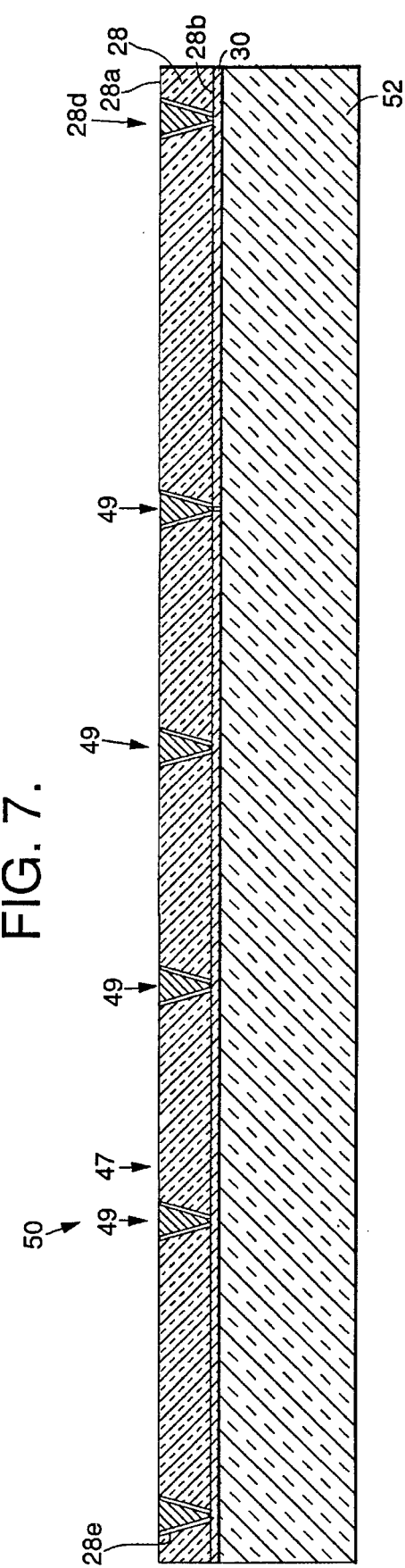

In the step of FIG. 7, the via openings 28d, 28e and 49a are formed through the semiconductor layer 28. This is accomplished by patterning the outer surface 28a of the semiconductor layer 28 and etching the via openings using conventional photolithographic processing. The surface 28a is then thermally oxidized to coat the walls of the openings 49a with the insulating layer 49b, and similarly coat the walls of the via openings 28d and 28e. The thermal oxide is then patterned and etched to form openings for fabrication of the transistors 42 and capacitors 47.

As illustrated in FIG. 8, the transistors 42 and driver circuits 38 and 40 are fabricated in the outer surface 28a of the semiconductor layer 28 using, for example, ion implantation and annealing. The trenches 47a for the capacitors 47 are patterned and etched, and the insulating layers 47b are grown and patterned using conventional photolithographic technology.

In FIG. 9, the outer surface 28a is coated with polysilicon, patterned and etched to form the polysilicon layers 47c for the trench capacitors 47. The select lines 34 and 36, bond pads 46 and 48 and metallization 49d for the vias 49 are deposited such that the metallization 49d fills the openings 49a. The step of FIG. 9 may include the formation of additional microelectronic devices or structures, such as light blocking shields for the transistors 42, although not explicitly illustrated.

FIG. 10 illustrates how the structure 50 is inverted from the orientation of FIG. 9, and bonded to the substrate 12 using the adhesive 22.

In FIG. 11, the carrier wafer 52 is removed using an etchant to which the insulating layer 30 (silicon dioxide or other insulating material) is resistant. The preferred etchant in the case of silicon dioxide is potassium hydroxide (KOH), with the layer 30 acting as a etch stop layer. The openings 49c of the vias 49 as well as extensions of the via openings 28d and 28e are formed through the insulating layer 30.

The electrodes 20 are formed on the insulting layer 30 by deposition, patterning and etching such that the material thereof fills the openings 49c and makes ohmic contact with the metallization 49d in the vias 49. The wirebonds 44 and 45 are connected to the bonding pads 46 and 48 respectively.

The front electrode 16 is deposited onto the inner surface 14a of the front plate 14, and the plate 14 is adhered to insulating layer 30 and thereby to the inner surface 28b of the semiconductor layer 28 by the peripheral seal 32. The space 24 is filled with the liquid crystal material 26 to produce the display 10 as illustrated in FIG. 1.

While an illustrative embodiment of the invention has been shown and described, numerous variations and alternate embodiments will occur to those skilled in the art, without departing from the spirit and scope of the invention. Accordingly, it is intended that the present invention not be limited solely to the specifically described illustrative embodiment. Various modifications are contemplated and can be made without departing from the spirit and scope of the invention as defined by the appended claims.

We claim:

1. A reflective liquid crystal display, comprising:

a substrate;

a monocrystalline semiconductor layer having an outer surface which is adhered to the substrate, and an inner surface;

a back electrode formed on said inner surface of the semiconductor layer;

a microelectronic driver device which is formed on said outer surface of the semiconductor layer and operatively connected to the back electrode;

a storage capacitor means which is formed on said outer surface of said semiconductor layer and operatively connected to the device driver and the back electrode;

a transparent plate;

a transparent front electrode formed on the plate;

sealing and spacing means for attaching the plate to the substrate such that a sealed space is defined between said plate and said substrate, with the front electrode being disposed in said space; and a liquid crystal material provided in said space.

2. A display as in claim 1, in which an interconnect means extending through the semiconductor layer provides said operative connection between the back electrode and the driver device.

3. A display as in claim 1, in which the capacitor means is connected in parallel with the back electrode.

4. A display as in claim 3, in which the capacitor means comprises a trench capacitor.

5. A display device as in claim 3, in which: an interconnect means extending through the semiconductor layer provides said operative connection to the back electrode; and the capacitor means is connected between the driver device and the interconnect means.

6. A display as in claim 5, in which the capacitor means comprises a trench capacitor.

7. A display as in claim 1, in which the semiconductor layer is approximately 2–8 micrometers thick.

8. A display as in claim 1, in which the semiconductor layer is formed of silicon.

9. A display as in claim 1 further comprising microelectronic circuit means for controlling said driver device, said microelectronic circuit means being formed on said outer surface of said semiconductor layer.

10. A display device as in claim 9, in which an interconnect means extending through said semiconductor layer operatively connects said circuit means with said back electrode.

11. A display device as in claim 10, in which the interconnect means comprises:

an opening formed through said semiconductor layer;

bonding pad means formed on said outer surface of said semiconductor layer; and conductor means extending through said opening into ohmic connection with the bonding pad means.

12. A display as in claim 11, in which the conductor means comprises a wirebond.

* * * * *